United States Patent
Johnson

(10) Patent No.: US 10,106,901 B2
(45) Date of Patent: Oct. 23, 2018

(54) SCALABLE ENERGY DEMAND SYSTEM FOR THE PRODUCTION OF HYDROGEN

(71) Applicant: Edward Eugene Johnson, Orlando, FL (US)

(72) Inventor: Edward Eugene Johnson, Orlando, FL (US)

(73) Assignee: Edward E. Johnson, Orlando, FL (US)

( * ) Notice: Subject to any disclaimer, the term of this patent is extended or adjusted under 35 U.S.C. 154(b) by 439 days.

(21) Appl. No.: 14/944,583

(22) Filed: Nov. 18, 2015

(65) Prior Publication Data

US 2016/0222531 A1    Aug. 4, 2016

Related U.S. Application Data

(60) Provisional application No. 62/111,480, filed on Feb. 3, 2015.

(51) Int. Cl.
| | |
|---|---|
| *H01M 8/0656* | (2016.01) |
| *C25B 15/02* | (2006.01) |
| *C25B 9/04* | (2006.01) |
| *C25B 9/18* | (2006.01) |

(52) U.S. Cl.
CPC .............. *C25B 15/02* (2013.01); *C25B 9/04* (2013.01); *C25B 9/18* (2013.01); *H01M 8/0656* (2013.01); *H01M 2250/10* (2013.01); *Y02B 90/14* (2013.01)

(58) Field of Classification Search
CPC . H01M 8/0656; H01M 2250/10; Y02B 90/14; C25B 15/02; C25B 9/18; C25B 9/04

USPC .......................................................... 429/422
See application file for complete search history.

(56) References Cited

U.S. PATENT DOCUMENTS

| | | | |
|---|---|---|---|
| 3,870,616 A | * | 3/1975 | Dempsey ................ C25B 15/02 |
| | | | 204/228.5 |
| 4,160,287 A | | 7/1979 | Chillier-Duchatel et al. |
| 4,340,452 A | | 7/1982 | deNora |
| 4,643,818 A | | 2/1987 | Seko et al. |
| 5,141,619 A | | 8/1992 | Muret |
| 8,257,563 B2 | | 9/2012 | Hartvigsen |
| 2003/0157381 A1 | | 8/2003 | Van Andel et al. |
| 2005/0016840 A1 | | 1/2005 | Petillo |
| 2005/0084739 A1 | | 4/2005 | Swider-Lyons et al. |
| 2007/0116996 A1 | | 5/2007 | Pavlik et al. |
| 2007/0205110 A1 | | 9/2007 | Lang |

(Continued)

*Primary Examiner* — Gary D Harris
(74) *Attorney, Agent, or Firm* — Edward E. Johnson

(57) ABSTRACT

A control system for optimizing simultaneous operation of multiple electrolysis cells is provided. The control system includes a plurality of capacitors connected to at least one of the electrolysis cells and configured to continuously discharge to provide power to the electrolysis cells. The control system also includes an input power source configured to provide power to charge the plurality of capacitors. The control system further includes a plurality of switches configured to selectively connect and disconnect the input power source to one or more capacitors. The control system also includes a control circuit configured to switch the operation state of the plurality of switches based on a time signal such that at any instant the plurality of capacitors are discharging to provide power to the corresponding electrolysis cells, and the one or more capacitors are being charged by consuming power from the input power source.

9 Claims, 2 Drawing Sheets

(56) References Cited

U.S. PATENT DOCUMENTS

| | | |
|---|---|---|
| 2008/0094868 A1* | 4/2008 | Meyers ............ H01M 8/04089 |
| | | 363/98 |
| 2008/0193810 A1 | 8/2008 | Gil et al. |
| 2009/0026089 A1 | 1/2009 | Kothe et al. |
| 2011/0024287 A1 | 2/2011 | Zheng et al. |
| 2011/0100328 A1 | 5/2011 | Paul |
| 2012/0222954 A1 | 9/2012 | Lothring |

* cited by examiner

SCALABLE ENERGY DEMAND SYSTEM FOR THE PRODUCTION OF HYDROGEN

TECHNICAL FIELD

The present disclosure relates to a fuel cell based power system, and more particularly relates to system and method for optimizing simultaneous operation of multiple electrolysis cells to produce fuel for the fuel cells.

BACKGROUND

In power systems employing renewable energy sources, it is often desirable to store excess energy for use during times when power demand exceeds power generation capacity. For example, in a system employing wind, solar, and hydroelectric power generation, an excess of energy may be produced on a clear, windy day, but on a cloudy, calm day, or a calm night, power demand may exceed what these sources may produce. Further electrical demands placed on the local grid will vary during the course of a day, week, or season. Since it is not often practical or possible to turn generation sources on and off, inevitably excess energy will be created. So some energy storage means are required to store the excess energy produced during the production period and which can later be used to utilize the stored energy to provide power for consumption. Various solutions have been realized, such as using batteries, etc. for this purpose. Using hydrogen gas as an energy storage medium has been found to be particularly attractive due to its relatively high energy value and storage capacity.

Hydrogen can be produces with a large amount of electricity such as electrolysis. Electrolysis is one of the well-established technologies for hydrogen production. Electricity is used by an electrolysis cell to generate hydrogen and oxygen with heat and water as by products. The generated hydrogen is then compressed and stored in, for example, tube trailers which can be used by a fuel cell plant to generate electricity at any time. This approach is particularly of interest in small isolated grids.

It is observed that the hydrogen production rate can be increased by using multiple electrolysis cells simultaneously. However, the conventional power systems may not be sufficiently equipped to simultaneously power multiple electrolysis cells. For example, the known power systems directly use a power source, such as the renewable energy source, of a particular rated power (voltage and current) for electrolysis of water, using the electrolysis cell, for hydrogen production. Such power systems may be inefficient because at any given instant these can only power one electrolytic cell using the direct connection with the power source.

Therefore there is a need of a system which can replicate the input power source to power multiple electrolytic cells simultaneously and thus significantly increase the rate of hydrogen production.

SUMMARY

In one aspect, the present disclosure provides a control system for optimizing simultaneous operation of multiple electrolysis cells. The control system includes a plurality of capacitors. Each of the plurality of capacitors is connected to at least one of the electrolysis cells. The plurality of capacitors is configured to continuously discharge to provide power to the electrolysis cells. The control system also includes an input power source configured to provide power to charge the plurality of capacitors. The control system further includes a plurality of switches configured to selectively connect the input power source to one or more capacitors in a closed operation state and selectively disconnect the input power source from the one or more capacitors in an open operation state. The control system also includes a control circuit configured to switch the operation state of the plurality of switches based on a time signal such that at any instant the plurality of capacitors are discharging to provide power to the corresponding electrolysis cells, and the one or more capacitors are being charged by consuming power from the input power source.

In another aspect, the present disclosure provides a method for optimizing simultaneous operation of multiple electrolysis cells. The method includes continuously discharging a plurality of capacitors to provide power to the electrolysis cells connected therewith. The method also includes arranging an input power source to provide power to charge the plurality of capacitors via a plurality of switches. The plurality of switches configured to selectively connect the input power source to one or more capacitors in a closed operation state and selectively disconnect the input power source from the one or more capacitors in an open operation state. The method further includes switching the operation state of the plurality of switches based on a time signal such that at any instant the plurality of capacitors are discharging to provide power to the corresponding electrolysis cells, and the one or more capacitors are being charged by consuming power from the input power source.

In yet another aspect, the present disclosure provides a power system. The power system includes one or more load units and one or more fuel cells configured to provide power to each of the one or more load units. The power system also includes a plurality of electrolysis cells configured to produce fuel for each of the one or more fuel cells. The power system further includes a control system for optimizing simultaneous operation of the plurality of electrolysis cells. The control system includes a plurality of capacitors. Each of the plurality of capacitors is connected to at least one of the electrolysis cells. The plurality of capacitors configured to continuously discharge to provide power to the electrolysis cells. The control system also includes an input power source configured to provide power to charge the plurality of capacitors. The control system further includes a plurality of switches configured to selectively connect the input power source to one or more capacitors in a closed operation state and selectively disconnect the input power source from the one or more capacitors in an open operation state. The control system also includes a control circuit configured to sequentially switch the operation state of the plurality of switches based on a time signal such that at any instant the plurality of capacitors are discharging to provide power to the corresponding electrolysis cells, and the one or more capacitors are being charged by consuming power from the input power source.

DETAILED DESCRIPTION

Detailed embodiments of the present disclosure are described herein; however, it is to be understood that disclosed embodiments are merely exemplary of the present disclosure, which may be embodied in various alternative forms. Specific process details disclosed herein are not to be interpreted as limiting, but merely as a basis for the claims and as a representative basis for teaching one skilled in the art to variously employ the present disclosure in any appropriate process for preparing similar food products.

Figure 1:
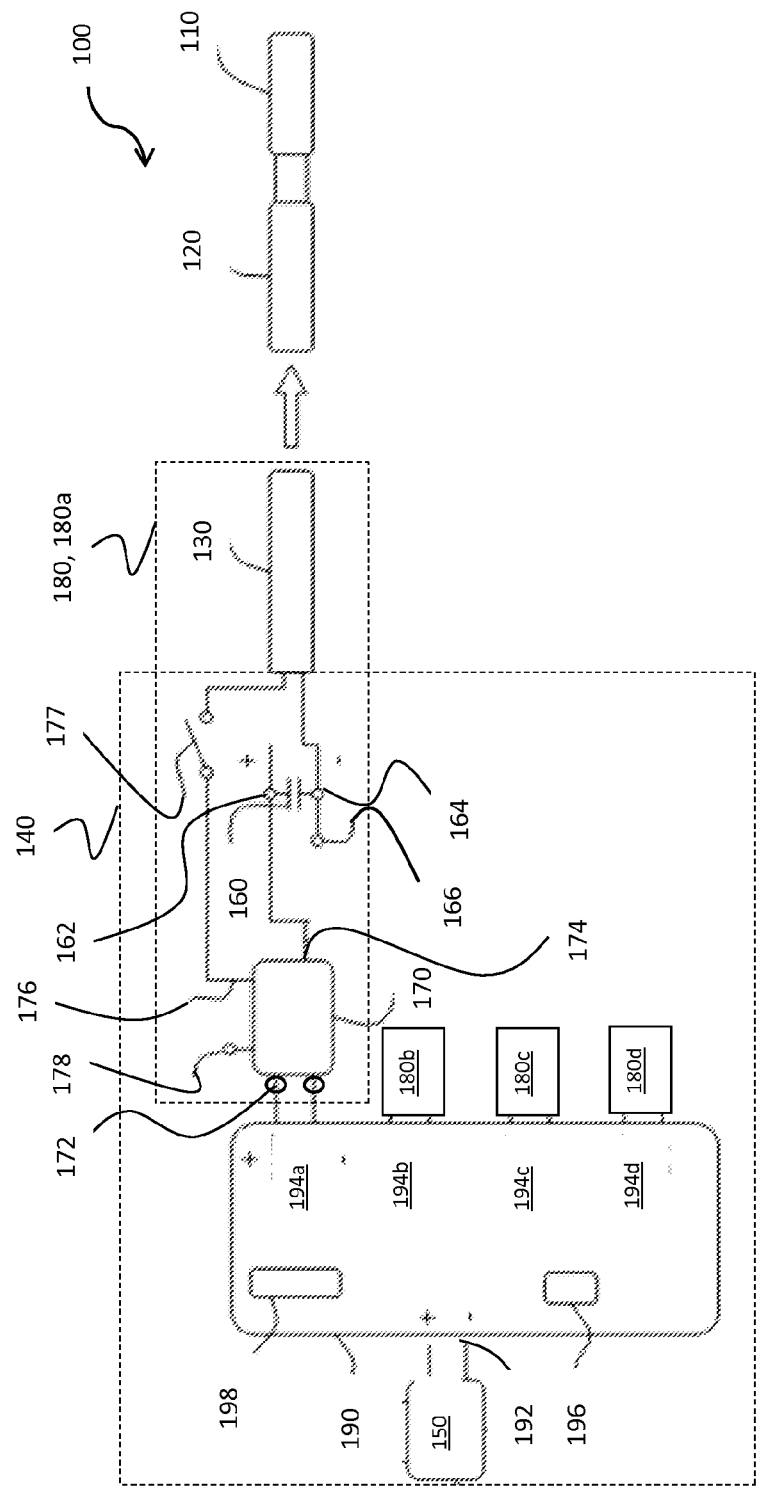
FIG. 1 illustrates a schematic representation of a power system, in accordance with an embodiment of the present disclosure.

FIG. 1 illustrates circuit diagram for a power system 100, in accordance with an embodiment of the present disclosure. The power system 100 includes one or more loads units 110. The loads units 110 may be any types of loads conventionally known. In one example, the load units 110 may be part of a smart grid supplying power to various homes and industrial units. In other example, the load units 110 may be a micro-grid, such as a home solar unit for powering electrical devices in a home environment. In yet another example, the load units 110 may be a standalone power consumption device, such as an electrical appliance, a car charging unit, etc.

In accordance with an embodiment, the power system 100 of the present disclosure provides one or more fuel cells 120 for each of the loads units 110. In a typical fuel cell, such as the fuel cell 120, hydrogen gas and reactant water are introduced to a hydrogen electrode (anode), while oxygen gas is introduced to an oxygen electrode (cathode). The hydrogen gas for fuel cell operation can originate from a pure hydrogen source, methanol or other hydrogen source. Hydrogen gas electrochemically reacts at the anode to produce hydrogen ions (protons) and electrons, wherein the electrons flow from the anode through an electrically connected external load, and the protons migrate through a membrane to the cathode. At the cathode, the protons and electrons react with the oxygen gas to form resultant water, which additionally includes any reactant water dragged through the membrane to cathode. The electrical potential across the anode and the cathode can be exploited to power the load unit 110.

Further, the power system 100 of the present disclosure includes a plurality of electrolysis cells 130. The electrolysis cells 130 are configured to produce fuel for each of the fuel cells 120. In one embodiment of the present disclosure, the electrolysis cells 130 are configured to produce hydrogen gas, as fuel, for the fuel cells 120. The same configuration, described above, is conventionally employed for electrolysis cell 130. In a typical electrolysis cell, process water is fed into a cell on the side of the oxygen electrode (in the electrolysis cell, the anode) to form oxygen gas, electrons, and protons. The electrolytic reaction is facilitated by the positive terminal of a power source (described later) electrically connected to the anode and the negative terminal of the power source connected to a hydrogen electrode (in an electrolytic cell, the cathode). The oxygen gas and a portion of the process water exit the electrolysis cell 130, while protons and water migrate across the proton exchange membrane to the cathode where hydrogen gas is formed. The hydrogen gas generated by the electrolysis cell 130 may then be used by the fuel cell 120.

In certain arrangements, the electrochemical cells can be employed to both convert electricity into hydrogen, and hydrogen back into electricity as needed. Such systems are commonly referred to as regenerative fuel cell systems. Regenerative fuel cells may be used in power generation systems as either primary or secondary power sources.

According to an embodiment, the power source 100 includes a control system 140 for optimizing simultaneous operation of the plurality of electrolysis cells 130. Primarily, the control system 140 includes an input power source 150.

The input power source 150 may be any power source known in the art, such as generated grid power or that from a renewable power source. In the example shown, the input power source 150 provides power along a primary bus (not shown); e.g., 120/240 volts alternating current (VAC). It will be appreciated that the actual primary supply voltage is based upon the type of power source including, but not limited to other alternating current (AC) voltage sources, direct current (DC) sources renewable sources such as wind, solar, and the like.

The control system 140 is configured to simultaneously power multiple electrolysis cells 130 using a single input power source 150. For this purpose, the control system 140 includes a plurality of capacitors 160 which temporarily holds the charge supplied by the third terminal 178. Each of the plurality of capacitors 160 is connected to at least one of the electrolysis cells 130. The plurality of capacitors 160 is configured to continuously discharge to provide power to the corresponding electrolysis cells 130. The energy used to charge the capacitors 160 can come directly from the third terminal 178, or from the output of a power converter (not shown) that converts 120 or 240 VAC to required voltage ratings of the capacitors 160. In one example, the power converter may be a rectifier that converts the input voltage into an appropriate voltage output, which is then used to charge the capacitor 160. The power converter may further detect intensities of voltages and currents from the third terminal 178 and controls the stepping up and down operation on the basis of the detected voltages and currents.

The control system further includes a plurality of switches 170. The plurality of switches 170 is configured to selectively connect the input power source 178 to the capacitor 160 in a closed operation state and selectively disconnect the input power source 178 from the capacitor 160 in an open operation state. The switch 170 may be a solid state power switch or a semiconductor switch, such as a Metal Oxide Semiconductor Field Effect Transistors (MOSFET) switch, or any other type of switch. In the preferred embodiment, the switch 170 is a high power, low voltage MOSFETs.

In an embodiment of the present disclosure, the switch 170 may be relay switch having a coil exhibiting hysteresis. The said relay switch may be a single pole, double throw switch, having one pole contact and two non-pole contacts. Each switch 170 has a first terminal 172 (hereinafter the "charging" terminal) coupled to the input power source 150. Further each switch 170 has a second terminal 174 (hereinafter the "discharging" terminal) coupled to one of the plurality of capacitors 160.

In an embodiment, the switch 170 also includes a relay arm 176 coupling the switch 170 to the electrolysis cell 130. The relay arm 176 may couple the switch 170 to the electrolysis cell 130 via the contact 177. Further the switch 170 includes a third terminal 178 which includes an input power to charge the capacitors. A fraction of energy produced by the fuel cell 120 may be returned back to the capacitor 160 via the third terminal 178 of the switch 170. In one example, 75% of the energy generated by the fuel cell 120 may be utilized to power the load while at least some portion of the remaining 25% power from the fuel cell 120 may be returned back to the capacitor 160 via the said third terminal 178 of the switch 170.

The capacitor 160 may also include terminals, for example, a first terminal 162 (hereinafter the "anode" terminal) and a second terminal 164 (hereinafter the "cathode" terminal). As illustrated, the anode terminal 162 may be connected to the discharging terminal 174, of the switch 170, to receive power from the input power source 178, and thereby charge the capacitor. Further, as illustrated, the cathode terminal 164 may be connected to the electrolysis cell 130 to provide power thereto, while discharging the capacitor 160. In one embodiment, the capacitor 160 may also include a third terminal 166 connected to the electrolysis cell 130. In one example, 75% of the energy generated by fuel cell may be utilized to power the load while at least some portion of the remaining 25% power may be returned back to the third terminal 178

As illustrated in FIG. 1, the various components of the control system 140 along with the corresponding electrolysis cell 130 are collectively called, hereinafter, a "sub-circuit" 180. It may be contemplated by a person skilled in the art that the control system 140 may include a plurality of such sub-circuits 180 (individually referred to as 180a, 180b, . . . , 180n). Similarly, the corresponding components can be numbered using same series suffixed to its numerals. Each of the sub-circuit 180 may be configured to consume power from the third terminal 178 to produce hydrogen fuel in its corresponding electrolysis cell 130, which in turn is used in the fuel cell 120.

In one example, the hydrogen fuel from the electrolysis cell 130 is used by a corresponding fuel cell 120. In alternate example, all the hydrogen fuel from each of the electrolysis cell 130, of the plurality of sub-circuits 180, is used by a single fuel cell 120 or a series of fuel cells 120. Such configurations may be contemplated by a person skilled in the art and have not been described in further detail.

In an embodiment of the present disclosure, the control system 140 includes a control circuit 190. The control circuit 190 is configured to switch the operation state of the plurality of switches 170, in the plurality of sub-circuits 180, based on a time signal 'T'. The control circuit switches the operation state in a manner such that at any instant the plurality of capacitors 160, in the plurality of sub-circuits 180, are discharging to provide power to the corresponding electrolysis cells 130 of the same sub-circuit 190. Further, the control system 140 ensures that at the same instant at least one capacitor 160 is being charged by consuming power from the third terminal 178.

It may be contemplated by a person skilled in the art that the control circuit 190 is essentially a micro-controller. In an exemplary configuration, the control circuit 190 is a widely used sequencer board, part #FA144, DC chasing light module. In other exemplary configuration, the control circuit 190 may be a computing device, such as, a personal computer (PC), a hand-held device, or servers, and may include a connection with a network, such as the Internet or other type of computer network. The computing device may include typical components like, a memory, a secondary storage device, a processor, an input device, a display device, and an output device. The memory may include random access memory (RAM) or similar types of memory and the secondary storage device may include a hard disk drive, floppy disk drive, CD-ROM drive, or other types of non-volatile data storage, and may correspond with various databases or other resources. Further, the processor may execute programs using data stored in the memory, the secondary storage, or received from the Internet or other network, to perform methods and functions described herein. The computing device may be configurable to be monitored remotely.

For the purpose of the present disclosure, the control circuit 190 includes an input terminal 192 configured to receive power from the input power source 150. As discussed, the input terminal 192 may be connected to the input power source 150 via some power converter or the like. Further, the control circuit 190 includes a plurality of output terminals 194 (individually referred to as 194a, 194b, . . . , 194n). Each of the plurality of output terminals 194 is connected to each of the plurality of sub-circuits 180. In particular, each of the plurality of output terminals 194 is connected to each of the plurality of switches 170, in the sub-circuits 180.

Further, the control circuit 190 includes a timing controller 196 configured to generate the time signal 'T'. The time signal 'T' is indicative of a time period such that the connection between the input terminal 192 and each output terminal (190a, 190b, . . . , 190n) is limited to the said time period. Therefore, the timing controller 196 is configured to restrict the time period for which the power is transferred from the input power source 150 to the plurality of switches 170. In an exemplary configuration, the timing controller 196 is a widely known 555 timer chip.

Also, the control circuit 190 includes a sequencing controller 198 configured to switch connection between the input terminal 192 and one output terminal, say 194a to between the input terminal 192 and next output terminal, say 194b. The sequencing controller 198 may be configured to switch the connection in a sequential manner, that is, from the first output terminal 194a to the second output terminal 194b, and so on. Further, the sequencing controller 198 may be configured to switch the connection in a cyclic manner, that is, when the first cycle of switching the connection from first output terminal 194a to last output terminal 194n is completed, the same cycle is repeated. The cycle may be repeated for predefined period, or as long as the input power source 150 is connected. In an exemplary configuration, the sequencing controller 198 is a widely known 4017 chip.

In an embodiment, the control circuit 190 may further ac to dc converter (not shown) before and/or after the electrolysis cell 130. The said converter may be a simple circuit based or may involve multiple components, such as using ac LED and then solar panels, etc. Such configurations may be contemplated by a person skilled in the art and have not been described in further detail for the brevity of the disclosure. In one example, the control circuit 190 may further be configured to take into consideration the various operational constraints of the electrolyzing cell 130 that may apply, such as, a minimum electric power that must be applied to the electrolyzing cell 130 to produce hydrogen, and power should not exceed a maximum electric power to avoid damage to the electrolyzing cell 130. In addition, the electrolyzing cell 130 has a minimum operating time through which the electrolyzing cell 130 should be operated to avoid damage, and a minimum down time during which the electrolyzing cell 130 should be left off to avoid damage. Further, the control circuit 190 may be configured to take into consideration, for example, electrolysis cell pressure, electrolysis cell temperature, and fuel output or generation.

INDUSTRIAL APPLICABILITY

The present disclosure provides a control system for optimizing simultaneous operation of the plurality of electrolysis cells. The control system utilizes the inherent feature of specific capacitors that the charging time of the capacitor is much lower than the discharging time. Therefore in some time period in which multiple capacitors may be fully charged, one of those capacitors may still have some charge left and be discharging to provide power. For the purpose of the present disclosure, the electrolysis cell may not discharge capacitor below 80% because capacitor is recharged back up to 100% even if the capacitor is sequentially and/or cyclically charged, as explained above. The number of capacitors, and thus the sub-circuits that could be powered by a single input power source may be dependent on the ratio of discharge rate to the charging rate of the capacitors employed.

Considering an example in which the control system 140 includes four sub-circuits 180. Let's consider that the control circuit 190 is configured to provide 30 W DC power to each of the plurality of capacitors 160 every 5 seconds (time signal 'T'). The control circuit 190 achieves this by sequentially operating the plurality of sub-circuits 180 that is, the first sub-circuit 180*a*, and then the second sub-circuit 180*b* and so on. In particular, the control circuit 190 is configured to operate the plurality of switches 170, like operating the first switch 170*a* to close for 5 seconds to transfer power from the third terminal 178 to the first capacitor 160*a* and then open the first switch 170*a* to stop transfer of power from the input power source 178 to the first capacitor 160*a*, and then operating the second switch 170*b* to close for 5 seconds to transfer power from the third terminal 178 to the second capacitor 160*b* and then open the second switch 170*b* to stop transfer of power from the input power source 178 to the second capacitor 160*b*, and so on. Four capacitors will discharge a total of 120 watts of power into four electrolysis cell while only 30 W of power is provided by the single input power source 178. The electrolysis cell discharge capacitor until capacitor remained about 80% charged up, but the corresponding switch 170 will be closed by that time to recharge capacitor back up to 100%. So the control system 140 may ideally utilize 120 watts of power every 5 seconds. Therefore, 30 W power from the third terminal 178 allows four capacitors to charge up with 30 W each, and thereby power four electrolysis cells simultaneously and concurrently using only the third terminal 178.

Figure 2:
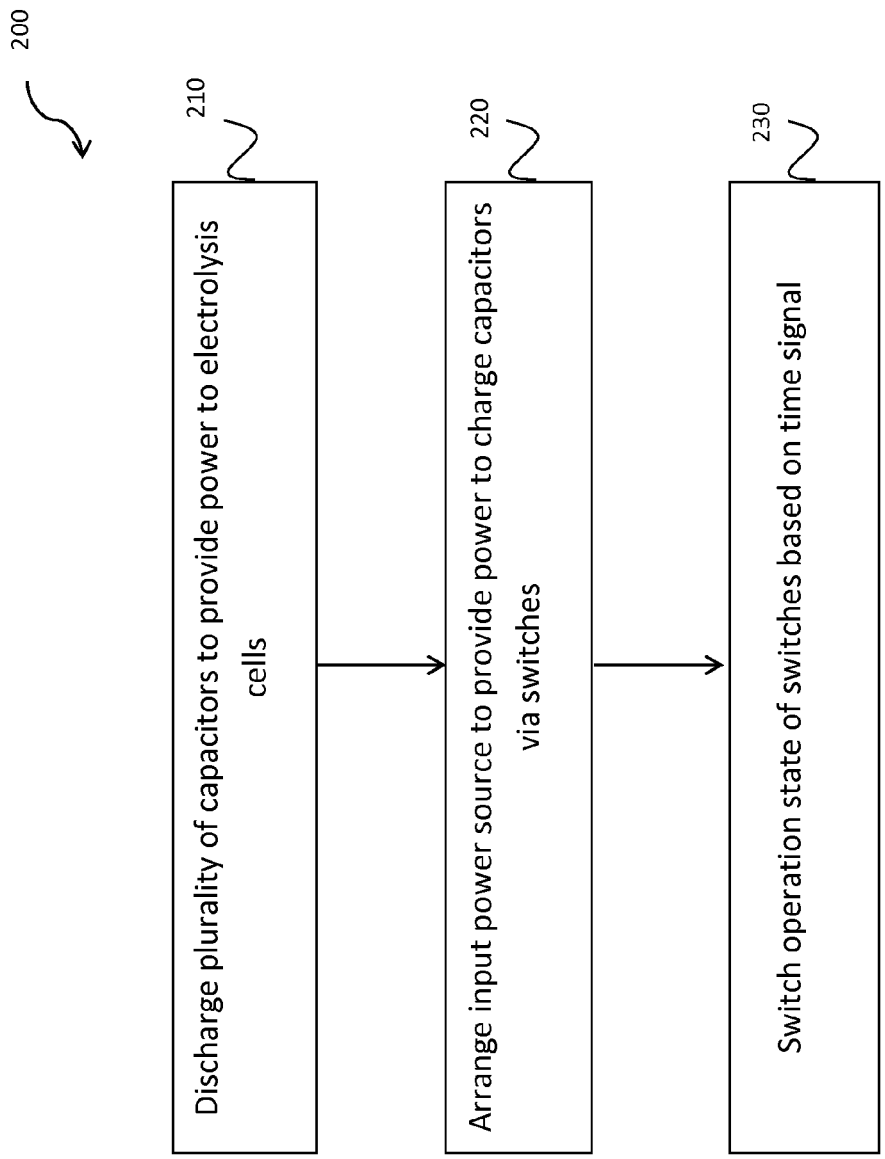
FIG. 2 illustrates a flow chart illustrating a method for optimizing simultaneous operation of multiple electrolysis cells, in accordance with an embodiment of the present disclosure.

As illustrated in FIG. 2, the present disclosure further provides a method 200 for optimizing simultaneous operation of multiple electrolysis cells. As shown, in block 210, the method 200 includes, continuously discharging the plurality of capacitors 160 to provide power to the electrolysis cells 130 connected therewith. In block 220, the method 200 includes, arranging the input power source 178 to provide power to charge the plurality of capacitors 160 via the plurality of switches 170 such that the plurality of switches 170 is configured to selectively connect the input power source 178 to the capacitor 160 in the closed operation state and selectively disconnect the input power source 178 from the capacitor 160 in the open operation state. In block 230, the method 200 includes, switching the operation state of the plurality of switches 170 based on the time signal 'T' such that at any instant the plurality of capacitors 160 are discharging to provide power to the corresponding electrolysis cells 130, and the capacitor 160 is being charged by consuming power from the third terminal 178.

The terms and descriptions used herein are set forth by way of illustration only and are not meant as limitations. Examples and limitations disclosed herein are intended to be not limiting in any manner, and modifications may be made without departing from the spirit of the present disclosure as defined in the appended claims. Those skilled in the art will recognize that many variations are possible within the spirit and scope of the invention as defined in the following claims, and their equivalents, in which all terms are to be understood in their broadest possible sense unless otherwise indicated.

I claim:
1. A scalable energy demand system for the production of hydrogen;
   wherein the system consists of a plurality of capacitors, a plurality of electrolysis cells, a control system and an input power source;
      wherein each capacitor is directly connected to the electrolysis cell,
      wherein the capacitor discharges in sequence into the electrolysis cell;
      the control system consists of a control circuit and a plurality of switches;
   the control circuit switches an operation state of the plurality of switches based on a time signal such that at any instant the plurality of capacitors are discharging to provide power to the corresponding electrolysis cell, and the one or more capacitors are being charged by consuming power from the input power source;
   the input power source is configured to provide power to charge the plurality of capacitors;
   the plurality of switches selectively connect the input power source to one or more capacitors in a closed operation state and selectively disconnect the input power source from the one or more capacitors in an open operation state
   wherein, the hydrogen gas produced by each of the electrolysis cells are directly connected to a fuel cell.
2. The control system of claim 1, wherein the control circuit comprises an input terminal configured to receive power from the input power source and a plurality of output terminals, each of the plurality of output terminals connected to each of the plurality of switches.
3. The control system of claim 2, wherein the control circuit further comprises a timing controller configured to generate the time signal indicative of a time period, such that the connection between the input terminal and each output terminal to receive power is limited to the said time period.
4. The control system of claim 3, wherein the control circuit further comprises a sequencing controller configured to switch connection between the input terminal and one output terminal to between the input terminal and next output terminal in a sequential and/or cyclic manner.
5. The control system of claim 1, wherein each of the plurality of switches comprises:
   a first terminal connected to the input power source; and
   a second terminal connected to one of the plurality of capacitors.
6. The control system of claim 1, wherein each of the plurality of switches comprises a relay arm to connect to the corresponding electrolysis cell.
7. The control system of claim 5, wherein each of the plurality of capacitors comprises:
   a first terminal connected to the second terminal of the corresponding switch; and
   a second terminal connected to the corresponding electrolysis cell.
8. The control system of claim 1, wherein each of the plurality of switches comprises a relay switch.
9. The control system of claim 8, wherein the relay switch is a Single Pole Double Throw (SPDT) relay switch.

\* \* \* \* \*